(12) United States Patent
Bhatt (10) Patent No.: US 8,007,578 B2
(45) Date of Patent: Aug. 30, 2011

(54) PIGMENTED INK HAVING INFRARED ABSORPTION AND LOW VISIBLE COLOR

(75) Inventor: Jayprakash C. Bhatt, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1209 days.

(21) Appl. No.: 11/246,502

(22) Filed: Oct. 7, 2005

(65) Prior Publication Data

US 2007/0082963 A1 Apr. 12, 2007

(51) Int. Cl.
*C09D 11/02* (2006.01)
*C09D 11/00* (2006.01)
*C09D 11/10* (2006.01)
*C08J 3/28* (2006.01)

(52) U.S. Cl. ............... 106/31.9; 106/31.13; 106/31.6; 522/71; 522/74; 522/81; 523/160; 347/100

(58) Field of Classification Search ............ 106/31.9, 106/31.13, 31.6; 347/100; 522/71, 74, 81
See application file for complete search history.

(56) References Cited

U.S. PATENT DOCUMENTS

| | | | | |
|---|---|---|---|---|
| 3,870,528 A * | 3/1975 | Edds et al. | | 106/31.47 |
| 4,680,058 A | 7/1987 | Shimizu et al. | | |
| 4,892,584 A * | 1/1990 | Chapman | | 106/31.48 |
| 5,135,803 A * | 8/1992 | Tanaka et al. | | 428/32.6 |
| 6,294,010 B1 * | 9/2001 | Pfaff et al. | | 106/415 |
| 6,647,369 B1 | 11/2003 | Silverbrook et al. | | |
| 6,910,014 B2 | 6/2005 | Silverbrook et al. | | |
| 2004/0255808 A1 * | 12/2004 | Nagashima | | 101/491 |
| 2005/0032957 A1 * | 2/2005 | Khan et al. | | 524/406 |
| 2005/0052519 A1 * | 3/2005 | Mayer et al. | | 347/105 |
| 2006/0084719 A1 * | 4/2006 | Huber | | 523/160 |
| 2008/0050535 A1 * | 2/2008 | Schmidt et al. | | 427/514 |

FOREIGN PATENT DOCUMENTS

| | | | |
|---|---|---|---|
| GB | 1534403 A | * | 12/1978 |
| WO | WO 02074548 A2 | * | 9/2002 |
| WO | WO 2004003070 A1 | | 1/2004 |
| WO | WO 2004090053 A1 | | 10/2004 |
| WO | WO 2005068207 A1 | * | 7/2005 |

OTHER PUBLICATIONS

Paint & Coatings Industry Magazine, Material Watch, "Pigments", Dec. 1, 2004, 5 pages, http://www.pcimag.com/Articles/Products/6654ca796d6a7010VgnVCM100000f932a8c0.*
Merck Chemicals Ltd., "Minatec 230 A-IR—The Polar Bear Effect", 2 pages; http://www.merck.de/servlet/PB/menu/1409240/index.html.*
EMD, "Minatec Bright and Conductive", 1 page; http://www.emdpigments.com/pigments/2058.asp.*
Merck, MSDS Minatec 31 CM; 4 pages.*
Iriodin LS for laser marking of plastics. Merck Brochure, Jun. 1997, pp. 1-24, Merck KGaA.*
Ammonium octamolybdate Product Description, Anqing Yutong Metallurgy Chemical Co. Brochure, 2009, one page.*
ADS (American Dye Source, Inc) product Bulletin for Near Infrared Laser dyes for Printing Applications. Nov. 4. pp. 1-13. Polysis Pure Products, Co.*

* cited by examiner

*Primary Examiner* — Sanza McClendon (57) ABSTRACT

An ink having infrared (IR) absorptivity includes an ink vehicle and an IR absorptive pigment having low visible color. According to one exemplary embodiment, the IR absorptive pigment includes an antimony-containing tin oxide.

14 Claims, 4 Drawing Sheets

PIGMENTED INK HAVING INFRARED ABSORPTION AND LOW VISIBLE COLOR

BACKGROUND

Infrared (IR) sensors and associated infrared absorptive inks have traditionally been used for tracking and authenticating a number of different objects. More specifically, labels, barcodes, or other identifiable markings formed from infrared absorptive inks have been formed on the surface of a number of objects. Once marked, objects could then be illuminated with IR light and examined by an infrared sensor to authenticate or track the object.

While a number of methods for tracking and authenticating objects with infrared sensors and associated infrared absorptive inks have traditionally been used, these traditional methods have a number of limitations. Specifically, traditional IR dyes have associated visible color to them, causing the resulting dye-based IR inks and the printed matter to be visibly colored. Additionally, dye-based IR inks have traditionally suffered from limited solubility in an ink base and low light fastness and environmental fastness (air, water, humidity, and thermal fastness). Further, traditional pigmented IR absorptive inks typically included carbon black as the IR absorptive material, resulting in a dark and highly visible ink. Consequently, some of the tracking and authentication effectiveness of the IR absorptive ink may be compromised.

SUMMARY

An ink having infrared (IR) absorptivity includes an ink vehicle and an infrared absorptive pigment having a low visible color.

According to one exemplary embodiment, an ultraviolet (UV) curable ink having infrared (IR) absorptivity includes a UV light curable matrix, a UV photoinitiator, and an infrared absorptive pigment having a low visible color.

According to yet another exemplary embodiment, a method for forming an ink having infrared (IR) absorptivity includes providing an ink vehicle and dispersing an IR absorptive pigment in the ink vehicle.

BRIEF DESCRIPTION OF THE DRAWINGS

The accompanying drawings illustrate various embodiments of the present system and method and are a part of the specification. The illustrated embodiments are merely examples of the present system and method and do not limit the scope thereof.

Throughout the drawings, identical reference numbers designate similar, but not necessarily identical, elements.

DETAILED DESCRIPTION

An exemplary formulation of an ink containing infrared (IR) absorptive pigments which exhibit low visible color is disclosed herein. More specifically, according to one exemplary embodiment, an ink containing IR absorptive pigments which provide low visible color characteristics includes an ink vehicle, a binder, and an IR absorptive pigment including antimony-containing tin oxides. According to this exemplary embodiment, the IR pigment may be any number of infrared absorptive or near infrared absorptive pigments that provide low visible color characteristics.

Before particular embodiments of the present system and method are disclosed and described, it is to be understood that the present system and method are not limited to the particular process and materials disclosed herein as such may vary to some degree. It is also to be understood that the terminology used herein is used for the purpose of describing particular embodiments only and is not intended to be limiting, as the scope of the present system and method will be defined only by the appended claims and equivalents thereof.

As used in the present specification and in the appended claims, the term "liquid vehicle" is defined to include liquid compositions that can be used to carry colorants, including pigments, to a substrate. Liquid vehicles are well known in the art, and a wide variety of liquid vehicle components may be used in accordance with embodiments of the present exemplary system and method. Such liquid vehicles may include a mixture of a variety of different agents, including without limitation, surfactants, co-solvents, buffers, biocides, viscosity modifiers, sequestering agents, stabilizing agents, and water. Though not liquid per se, the liquid vehicle can also carry other solids, such as polymers, UV curable materials, binders, plasticizers, salts, etc.

As used in the present specification and the appended claims, the term "ultraviolet curable ink" or "UV curable ink" is meant to be understood broadly as referring to any formulation of ink including a component that is configured to harden and/or cure when exposed to ultraviolet radiation. Additionally, the term "infrared absorptive pigment" or "IR absorptive pigment" is meant to be understood broadly as a pigment that absorbs light in the infrared light spectrum (light having a wavelength from approximately 1 micron to 1 mm). Similarly, the term "near infrared absorptive pigment" is meant to be understood as any pigment that absorbs light having a wavelength ranging from approximately 0.7 microns to approximately 3 microns. As used herein, the terms "infrared absorptive pigment" and "near infrared absorptive pigment" will be used interchangeably.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of approximately 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

In the following description, for purposes of explanation, numerous specific details are set forth in order to provide a thorough understanding of the present system and method for a low visibility ink having IR absorptivity. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Figure 1:
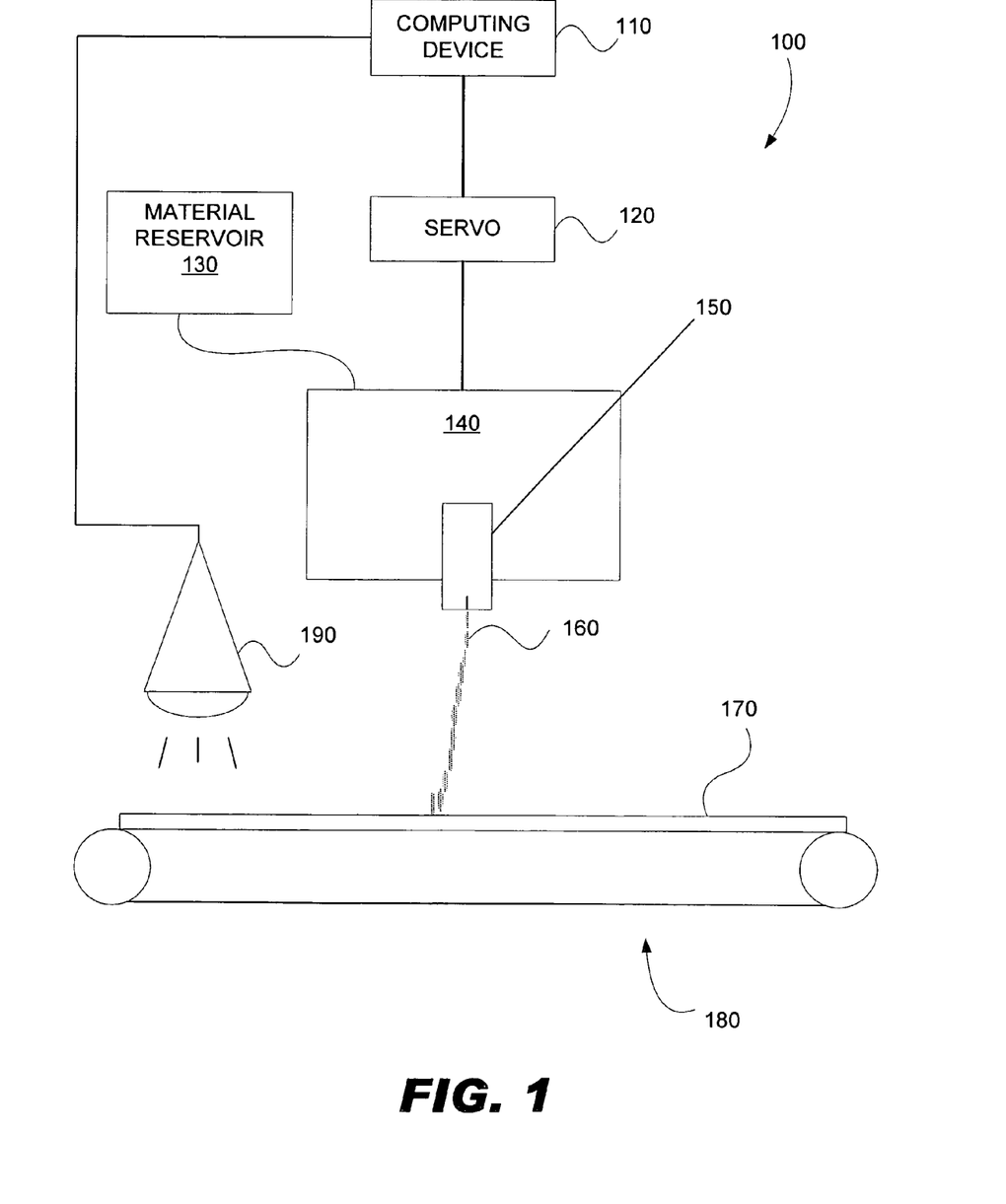
FIG. 1 is a perspective view of an ink dispensing apparatus, according to one exemplary embodiment.

FIG. 1 illustrates the components of an exemplary system that facilitates reception of an ink having IR absorptivity while exhibiting low visible color (160) onto the ink receiving medium (170). As shown in FIG. 1, a medium transport system (180) including a number of positioning rollers and/or belts may transport and positionally secure an ink receiving medium (170) during a printing operation. Alternatively, any number of belts, rollers, substrates, or other transport devices may be used to transport and/or positionally secure the ink receiving medium (170) during a printing operation, as is well known in the art. The ink having IR absorptivity may be applied to the ink receiving medium by any number of printing or coating methods known in the art such as inkjet, spin coating, flexographic, screen printing, or thermal transfer.

According to one exemplary embodiment, an inkjet material dispenser (150) forming part of a carriage (140) may be configured to receive the present IR absorptive ink (160) from a material reservoir (130) and selectively dispense the IR absorptive ink onto the ink receiving medium (170) with the aid of a computing device (110) and a number of servo mechanisms (120). According to this exemplary embodiment, the inkjet material dispenser (150) may include, but is in no way limited to, a mechanically actuated ink-jet dispenser, an electrostatically actuated ink-jet dispenser, a magnetically actuated dispenser, a piezoelectrically actuated dispenser, or a continuous ink-jet dispenser.

Moreover, a radiation applicator (190) is also shown in FIG. 1. According to one exemplary embodiment, a radiation applicator, such as that illustrated in FIG. 1, may be coupled to the exemplary system (100) to apply radiation to dispensed ink having IR absorptivity while exhibiting low visible color (160). Once deposited, the ink having IR absorptivity while exhibiting low visible color (160) may be cured through the application of radiation. According to one exemplary embodiment, the ink having IR absorptivity may be UV curable. In this exemplary embodiment, the radiation applicator (190) may be configured to initiate a curing reaction within the ink having IR absorptivity (160). Additionally, the radiation applicator (190) may be any device configured to apply ultraviolet (UV) or other radiation sufficient to set or cure deposited ink having IR absorptivity while exhibiting low visible color (160). The radiation applicator (190) may be a separate light exposer or scanning unit configured to flood expose all or selective portions of deposited UV curable ink having IR absorptivity (160).

Figure 2:
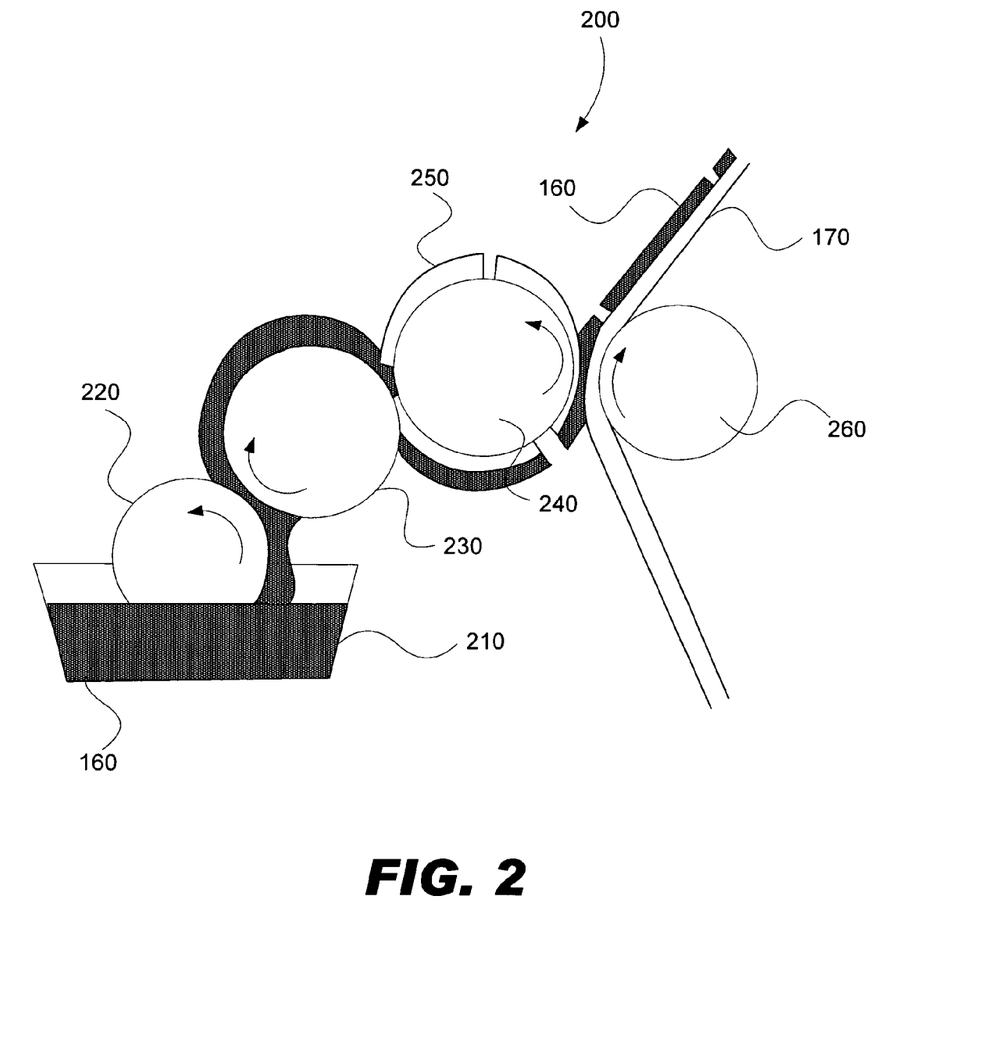
FIG. 2 is a side view of an image forming apparatus, according to one exemplary embodiment.

FIG. 2 illustrates the components of an alternative exemplary system that facilitates reception of an ink having IR absorptivity while exhibiting low visible color (160) onto the ink receiving medium (170). As illustrated in FIG. 2, a flexographic system (200) may be used to apply the ink having IR absorptivity while exhibiting low visible color (160) onto an ink receiving medium (170). As illustrated in FIG. 2, the ink having IR absorptivity while exhibiting low visible color (160) is housed in an ink pan (210) where it may be picked up by a fountain roll (220). Once the ink (160) is picked up by the fountain roll (220), it is then transferred to an anilox roll (230) and onto a plate cylinder (240) containing a number of image plates (250). With the ink coating the surface of the image plates (250), the ink receiving medium (170) is passed between the image plates and an impression cylinder (260) which facilitate the rapid transfer of the ink (160) from the image plates (250) to the ink receiving medium (170). Once transferred to the image receiving medium (170), the ink and the ink receiving medium may be transferred for further processing.

The formation and composition of the present ink having IR absorptivity while exhibiting low visible color (160) will now be described in further detail below.

Exemplary Composition

According to one exemplary embodiment, the present ink having IR absorptivity includes at least an IR absorptive pigment configured to exhibit low visible color and a vehicle. Additional components may also be added to the present ink including, but in no way limited to, organic or inorganic dyes or pigments to selectively modify the color and appearance of the UV curable ink, fillers, salts, surfactants, biocides, buffers, viscosity modifiers, sequestering agents, stabilizing agents, UV photoinitiators, UV curable matrix material, etc. The individual components of the present ink will be described in further detail below.

IR Absorptive Pigment

Traditionally, IR absorptive inks have included IR absorptive pigments containing carbon black as the IR absorptive material, resulting in a dark and highly visible print. IR absorptive prints that are dark and highly visible compromise a number of the tracking and authentication advantages of IR absorptive inks. More specifically, counterfeit prevention advantages have traditionally been compromised due to the use of IR absorptive pigments containing carbon black.

In contrast to traditional inks that incorporate IR absorptive pigments containing carbon black as the IR absorptive material, the present exemplary ink having IR absorptivity includes IR absorptive pigments that produce a very low visible color, resulting in nearly invisible prints when printed on a white or near-white substrate.

As used in the present exemplary embodiment, the term IR pigment may refer to any material which effectively absorbs radiation in the infra-red region of the electromagnetic spectrum. According to the present exemplary embodiment, the IR pigment used in the ink having IR absorptivity include, but are in no way limited to, a tin oxide containing transition metals and transition metal oxides. More specifically, according to one exemplary embodiment, the present IR pigment used in the ink having IR absorptivity and low visible color includes, but is in no way limited to, commercially available antimony-containing tin oxide known as Minatec® 230A-IR, marketed by EMD Chemicals.

According to one exemplary embodiment, the pigments used as the IR pigment includes a layer structure having a layer of antimony-doped tin dioxide.

According to one exemplary embodiment, the above-mentioned pigment is prepared from an aqueous tin and antimony salt solution. According to this exemplary embodiment, a mixture of hydroxides is precipitated by the addition of a base. This forms a compact antimony-containing tin oxide. Formula 1 below illustrates the above-mentioned formation process, according to one exemplary embodiment.

$$xSn^{4+} + ySb3 + \overset{H_2O}{\rightarrow} xSnO_2/y/2Sb_2O_3 \overset{annealing}{\rightarrow} (Sn_xSb_y)O_2 \quad \text{Formula 1}$$

Figure 3:
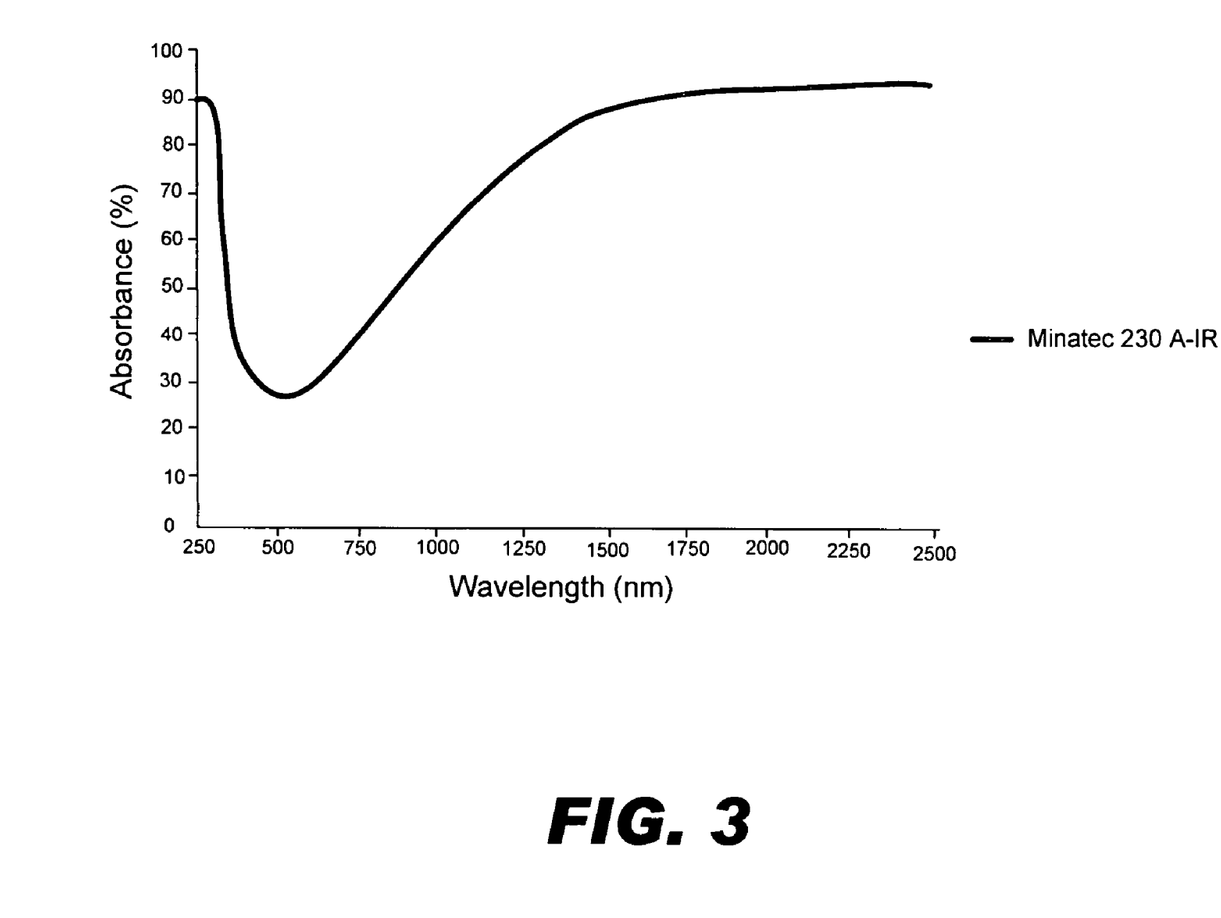
FIG. 3 is a graph illustrating the light absorption characteristics of a pigment having IR absorptivity, according to one exemplary embodiment.

As a result of the above-mentioned formation, light gray or near white pigments having particle sizes from between approximately 1 and 20 µm may be formed. Moreover, according to one exemplary embodiment, the IR pigments including antimony-containing tin oxides may have IR absorbance characteristics as illustrated in FIG. 3. More specifically, according to one exemplary embodiment illustrated in FIG. 3, the exemplary IR pigments including antimony-containing tin oxides may be configured to have an IR absorbance between 10-60%, specifically 30-60% absorbance for light of a wavelength between approximately 700-1000 nm, absorbance of between 20-88%, more specifically between 60-88% absorbance for light of a wavelength between approximately 1000-1500 nm, and an absorbance between approx. 20-95%, more specifically 50-95% for light of a wavelength between approximately 1500-2500 nm.

Figure 4:
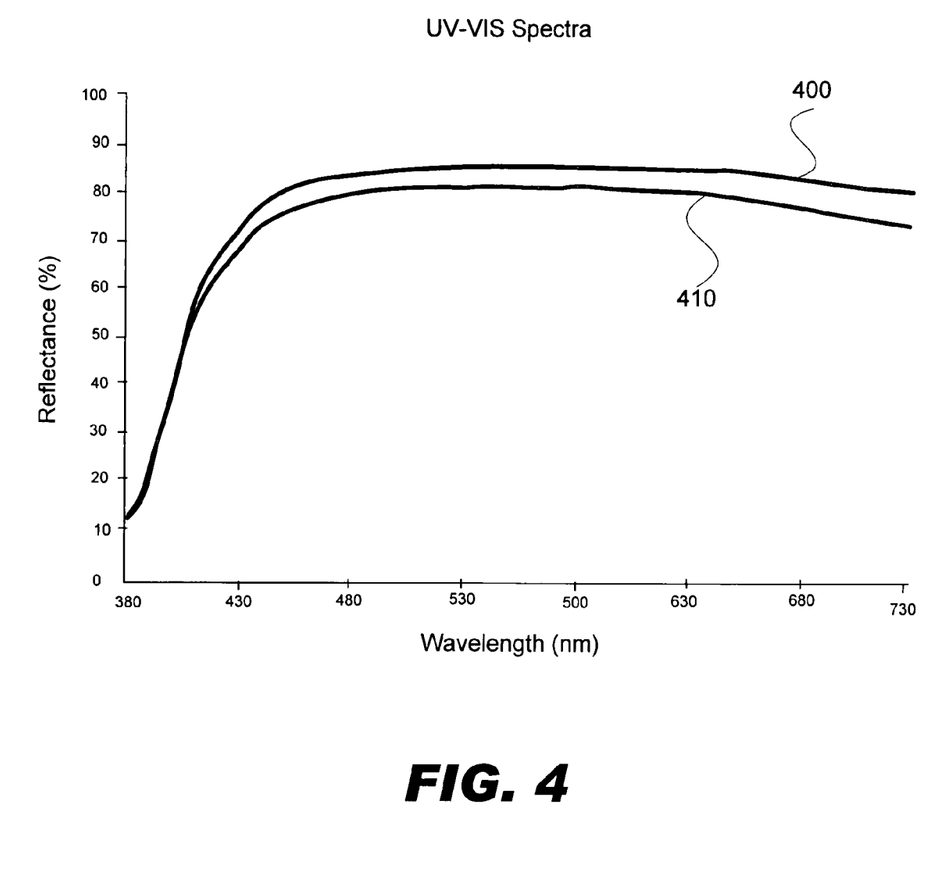
FIG. 4 is a graph illustrating the visible spectrum of two inks containing infrared (IR) absorptive pigments which exhibit low visible color, according to one exemplary embodiment.

Additionally, as mentioned previously, the exemplary IR pigments including antimony-containing tin oxides exhibit low visible color. According to one exemplary embodiment, inks exhibiting low color may be quantified as exhibiting low optical density (OD). For example, FIG. 4 illustrates the visible spectrum characteristics of a first (400) and a second (410) ink formulation containing antimony-containing tin oxides. As illustrated in FIG. 4, the exemplary inks (400, 410) exhibit high reflectance values and low visible color. Additionally, the exemplary inks illustrated in FIG. 4 exhibited C* values of approximately 5.5 and 5.9 respectively and OD values of approximately 0.07 and 0.09 respectively.

In addition to the above-mentioned exemplary IR absorptive pigments, near infrared absorbing pigments exhibiting low visible color may also be incorporated into the present ink having IR absorptivity.

According to the present exemplary embodiment, the above-mentioned IR and near IR pigments may comprise between approximately 0.01 to 70.0% of the ink having IR absorptivity. More specifically, according to one exemplary embodiment, the IR and near IR pigment comprises approximately 50.0% of the ink having IR absorptivity.

Liquid Vehicle

As mentioned, the ink having IR absorptivity (160) of the present exemplary system and method includes a liquid vehicle that imparts a number of viscosities and other properties to the present ink which makes it suitable for different ink application methods such as inkjet, flexographic, offset, thermal transfer or screen printing. According to one exemplary embodiment, the liquid vehicle of the present ink having IR absorptivity may include, but is in no way limited to, an aqueous formulation or liquid vehicle which can include water, cosolvents, surfactants, buffering agents, biocides, sequestering agents, viscosity modifiers, humectants, binders, and/or other known additives. Typically, for inkjet ink compositions of the present exemplary system and method, a viscosity is achieved of between about 0.8 to about 8 centipoise (cps). In one exemplary embodiment, the liquid vehicle can comprise from approximately 70 wt % to about 99.9 wt % of the inkjet ink composition. In another aspect, other than the above-mentioned IR absorptive pigments, the liquid vehicle can also carry polymeric binders, UV photo initiators, latex particulates, and/or other solids. Additionally, for other coating methods, such as flexographic printing, the viscosity of the ink composition may be increased to aid in the coating methods.

According to one embodiment, the liquid vehicle is primarily aqueous. According to this embodiment, the water liquid vehicle imparts a jettable viscosity to the ink, while providing desirable reliability characteristics.

As described above, cosolvents can also be included in the exemplary ink compositions (160). Suitable cosolvents include water soluble organic cosolvents, but are in no way limited to, aliphatic alcohols, aromatic alcohols, diols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, according to one embodiment, cosolvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly (propylene glycol) alkyl ethers, lactams, substituted formamides, unsubstituted formamides, substituted acetamides, and unsubstituted acetamides. Specific examples of cosolvents that are preferably employed include, but are not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone.

Cosolvents can be added to reduce the rate of evaporation of water in the ink to minimize clogging or other properties of the ink such as viscosity, pH, surface tension, optical density, and print quality. The cosolvent concentration can range from about 1 wt % to about 40 wt %, and in one embodiment is from about 2 wt % to about 30 wt %. Multiple cosolvents can also be used, as is known in the art.

Various buffering agents or pH adjusting agents can also be optionally used in the compositions of the present exemplary system and method. Typical buffering agents include such pH control solutions as hydroxides of alkali metals and amines, such as lithium hydroxide, sodium hydroxide, potassium hydroxide; citric acid; amines such as triethanolamine, diethanolamine, and dimethylethanolamine; hydrochloric acid; and other basic or acidic components which do not substantially interfere with the IR absorptivity of the present exemplary system. If used, buffering agents typically comprise less than about 10 wt % of the ink composition.

Additionally, various biocides may be incorporated into the IR absorptive ink compositions (160) to inhibit growth of undesirable microorganisms. Several non-limiting examples of suitable biocides include benzoate salts, sorbate salts, commercial products such as NUOSEPT (Nudex, Inc., a division of Huls America), UCARCIDE (Union Carbide), VANCIDE (RT Vanderbilt Co.), and PROXEL (ICI Americas) and other known biocides. Typically, such biocides comprise less than about 5 wt % of the ink composition and often from about 0.1 wt % to about 0.25 wt %.

In an additional aspect of the present system and method, binders can be included in the liquid vehicle of the ink which act to secure the colorants on the substrate. Binders suitable for use in the ink compositions (160) typically have a molecular weight of from about 1000 Mw to about 3,000,000 Mw. Non-limiting examples include polyester, polyester-melanine, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, and salts thereof.

If surfactants are present in the ink compositions (160), then typical water-soluble surfactants such as TRITONS™ (including ethoxylated octylphenols), IGEPALS™ (including alkyl phenoxypoly (ethleneoxy)ethanols), SILWETS™ (including silicone glycol copolymers including polyalkylene oxide-modified polydimethylsiloxanes, SURFYNOLS™ (including ethoxlyated tetramethyl decyndiols), TERGITOLS™ (including ethoxylated trimethylnonanols), BRIJS™ (including polyoxyethylene ethers), PLURONICS™ (including ethylene oxide/propylene oxide copolymers), FLUORADS™ and ZONYLS™ (including fluorosurfactants), and NEODOLS™ (including nonionic ethoxylated surfactants). Other surfactants or wetting agents that can be used include Wetting Olin10G, alkyl polyethylene oxides, alkyl phenyl polyethylene oxides, polyethylene oxide (PEO) block copolymers, acetylenic PEO, PEO esters, PEO amines, PEO amides, and dimethicone copolyols. Any of these surfactants, or combination of these surfactants or other surfactants, can be present at from 0.01 wt % to about 10 wt % of the ink composition.

In addition to the above-mentioned ink vehicles, the present exemplary ink composition (160) may alternatively include an organic solvent based ink vehicle sufficient to facilitate a desired coating method. More specifically, according to one exemplary embodiment, the organic solvent may include, but is in no way limited to, ketones with more then 3 carbon atoms; 2-butanone; toluene; tetrahydrofurans; aliphatic alcohols esters of such alcohols, for example, acetates and propionates; terpenes such as pine oil and alpha- or beta-terpineol, or mixtures thereof; ethylene glycol and esters thereof, such as ethylene glycol monobutyl ether and butyl cellosolve acetate; carbitol esters, such as butyl carbitol, butyl carbitol acetate and carbitol acetate and other appropriate solvents such as Texanol® (2,2,4-trimethyl-1,3-pentanediol monoisobutyrate); ethylacetate, methanol, isoproanol, acetone, xylene, and ethanol.

UV Curable Matrix

According to one embodiment, the ink having IR absorptivity includes a UV curable matrix. Upon deposition of the image forming ink having IR absorptivity (160), a UV curable matrix may provide a binding matrix that positionally secures the IR pigment dispersed in the UV curable ink. Additionally, once cured, the UV curable matrix forms a protective coating around the IR pigment to provide scratch resistance and environmental fastness. As illustrated in FIG. 1, a radiation applicator (190) may be used to initiate the UV curing process. More specifically, during the UV curing process, the polymers of the UV curable matrix are cross linked to form a substantially continuous structure that surrounds the IR pigment.

According to one exemplary embodiment, the UV curable matrix may include a blend of UV curable monomers, dimmers, and oligomers of different viscosities. The UV curable material may be selected to be a blend of acrylate functionality such as monofunctional, difunctional, trifunctional and multifunctional acrylates. Further, the matrix may contain various UV curable dilutents of low viscosity & functionality to give the final ink viscosity suitable for a desired printing process. As mentioned previously, the present IR absorptive ink may be incorporated with any number of ink dispensing mechanisms. By varying the quantity of UV curable dilutents of low viscosity and/or molecular weight, the viscosity of the resulting ink may be modified to match a desired ink dispensing mechanism or other application. Further, the addition of monofunctional, difunctional, trifunctional, and multifunctional acrylates balances cure density while adding lateral strength to the resulting UV curable matrix.

According to one exemplary embodiment, the UV curable matrix may include any number of epoxy and/or acrylate oligomers. The curable matrix may include, but is in no way limited to, bis-A epoxy acrylate, bis-A epoxy acrylate with 40% tripropylene glycol diacrylate, bis-A epoxy acrylate with 20% tripropylene glycol diacrylate, aromatic epoxy acrylate, polyethylene acrylate oligomer, aliphatic urethane acrylate oligomer with bound silicone, epoxy acrylate, metallic diacrylate, DEG diacrylate, polyethyleneglycol (PEG) 600 diacrylate, 1,4-butanediol diacrylate, 1,6-hexanediol diacrylate, ethyoxylated TMP-triacrylate, pentaerythritol triacrylate, tetrahydrofurfuryl acrylate, metallic acrylate, 2-(2-ethoxy ethoxy)ethyl acrylate, and mixtures thereof.

More specifically, the above-mentioned UV curable matrixes are commercially available under the following names: Sartomer CN104, Sartomer CN104A60, Sartomer CN104A80, Sartomer CN115, Sartomer CN292, Sartomer CN293, Sartomer CN294, Sartomer CN990, Sartomer CN2204, Sartomer CN2400, Sartomer SR306, Sartomer SR230, Sartomer SR610, Sartomer SR213, Sartomer SR502, Sartomer SR9035, Sartomer SR444, Sartomer SR285, and Sartomer SR256. Additionally, appropriate combinations of the above-mentioned UV curable matrix materials may be used to form the present UV curable ink having IR absorptivity. Further, the UV curable ink having IR absorptivity may include UV curable matrix material produced by any number of commercial providers including, but in no way limited to, Sartomer or Borden Chemical.

According to one exemplary embodiment of the UV curable matrix may comprise from between approximately 35 to 99.9% of the UV curable ink having IR absorptivity. More specifically, according to one exemplary embodiment, approximately 48% of the UV curable ink having IR absorptivity is comprised of UV curable matrix.

UV Photoinitiator

In addition to the above-mentioned UV curable matrix, a UV photoinitiator may also be included in the present ink having IR absorptivity. According to one exemplary embodiment, the UV photoinitiator is a reactive material configured to produce a polymerizing radical when exposed to a specific UV wavelength of light. The free radical is then configured to polymerize and cure the above-mentioned UV curable matrix. According to the present exemplary embodiment, the UV photoinitiator may include, but is in no way limited to, alpha-hydroxy ketones, alpha-amino ketones, bis-acylphosphine oxide (BAPO) initiators, benzophenone, acrylated amine synergists, and alpha-hydroxy propanones.

According to the present exemplary embodiment, the UV photoinitiator may be commercially manufactured by Ciba® under the trade name IRGACURE® or DAROCUR®. Additionally, the present UV photoinitiators incorporated by the present UV curable ink having IR absorptivity may be activated by a wide UV spectral absorption range. Further UV photoinitiator materials may be used from commercial providers including, but in no way limited to, Ciba® or Chitec Chemical.

According to one exemplary embodiment, the UV photoinitiator may comprise between approximately 0.010% and 15% of the ink having IR absorptivity. More specifically, according to one exemplary embodiment, the photoinitiator may comprise approximately 2% of the ink having IR absorptivity.

Ink Colorant

According to one exemplary embodiment, the above-mentioned ink having IR absorptivity may also include an ink configured to match the color of a desired substrate. More specifically, as mentioned above, the present ink having IR absorptivity results in an ink having a near-white color. Consequently, any number of dyes and/or pigment colorants may be added to the nearly white ink having IR absorptivity to produce an IR absorptive ink of any desired color. According to this exemplary embodiment, the dye and/or pigment colorant used to match a color of a substrate may or may not be IR absorptive. However, regardless of the IR absorptivity of the dye and/or pigment colorant, the colorant may vary the color of the resulting ink, thereby enabling the specific design of the resulting ink such that a printed image and/or design on any given substrate may be optically concealed.

Example

According to the above-mentioned teachings, a UV curable ink having IR absorptivity was formed. Once formed, the properties of the UV curable ink having IR absorptivity were examined. According to the exemplary embodiment a Sartomer UV curable matrix was first blended as illustrated in Table 1 below:

TABLE 1

| Ingredient | Percentage by Weight |
|---|---|
| CN292 | 20.8% |
| SR610 | 45.8% |
| SR213 | 33.4% |
| Total | 100% |

Once the above-mentioned UV curable matrix formulation was generated, it was used to form a UV curable ink having IR absorptivity. The composition of the UV curable ink having IR absorptivity is illustrated below in Table 2.

TABLE 2

| Ingredient | Ink % |
|---|---|
| UV Curable Matrix | 48% |
| Minatec ® 230A-IR | 50% |
| Irgacure 819 | 2% |
| Totals | 100% |

Once the above-mentioned formulation was generated, the ink was applied to photomedia using a #3 wire rod coater. After coating, the ink was UV cured using a UV curing system equipped with a medium pressure Mercury lamp having a belt speed of approximately 25 feet per minute. Once cured, the IR absorptivity of the coating was measured using an IR sensor having a sensitivity around 940 nm. The results of the IR measurements are illustrated below in Table 3. Sensors capable of measuring other IR wavelength may show different % sensor signal.

TABLE 3

| Object Tested | IR Measurement |
|---|---|
| Print Media | 3.0V |
| Print Media with IR Ink Print | 2.57V |
| % Sensor Signal | 14.3% |

As illustrated above in Table 3, the above-mentioned ink formulation exhibits IR absorptivity that varies from the IR characteristics of traditional print media. Consequently, any number of images may be printed on a substrate for tracking and authentication purposes including, but in no way limited to, a barcode or a product identifying trademark.

In addition to the above-mentioned formulation, a number of additional formulations were generated according to the present exemplary system and method. As illustrated in Table 4 below, each of the various formulations included substantially identical quantities of UV curable matrix and UV initiator. However, as shown in Table 4, the ratios of UV flexo white ink available from Sun Chemicals to Minatec® 230A-IR are varied to illustrate the effects of added IR absorptive pigments to the formulation.

TABLE 4

| Ingredient | Supplier | Sample 1 | Sample 2 | Sample 3 | Sample 4 |
|---|---|---|---|---|---|
| UV Flexo White | Sun Chemicals | 83.66% | 77.60% | 69.60% | 59.60% |
| SR610 | Sartomer | 1.98% | 1.98% | 1.98% | 1.98% |
| SR213 | Sartomer | 5.94% | 5.94% | 5.94% | 5.94% |
| Irgacure 819 | Ciba Specialty | 2.48% | 2.48% | 2.48% | 2.48% |
| Minatec 230A-IR | EMD Chemicals | 5.94% | 12.00% | 20.00% | 30.00% |
| Totals | | 100% | 100% | 100% | 100% |

The above-mentioned formulations were then applied to photomedia using a #3 wire rod coater. After coating, the inks were UV cured using a UV curing system equipped with a medium pressure Mercury lamp having a belt speed of approximately 25 feet per minute. Once cured, the IR absorptivity of the coatings was measured using an IR sensor having sensitivity around 940 nm. Additionally, the color and durability of the resulting prints were observed, as illustrated in Table 5 below.

TABLE 5

| Ink | % IR signal | Coating Color | Durability |
|---|---|---|---|
| Sample 1 | 20% | White | No Scratch |
| Sample 2 | 30% | White | No Scratch |
| Sample 3 | 34% | White | No Scratch |
| Sample 4 | 76% | White | No Scratch |

As illustrated above, an increase in IR absorptive pigment resulted in an increased IR absorptivity of the ink. Additionally, as illustrated above, each of the printed samples exhibited good durability. Additionally, as illustrated above, the present IR absorptive ink retains its IR absorptivity even after exposure to high intensity UV radiation used to cure the ink.

In conclusion, the present system and method for formulating a ink containing IR pigments having low visible color provides for increased security for object tracking and authentication. More specifically, according to one exemplary embodiment, the present ink having IR pigments with low visible color allows for the printing of an IR absorptive pigment on a substantially white substrate, while minimizing visibility of the printed pigment. Additionally, the near-white color of the present ink having IR absorptive pigments allows for the addition of any number of dyes and/or pigments for color matching purposes. Consequently, the UV curable ink having IR absorptive pigments can be tailored to match any number of desired substrates for any number of purposes including object tracking and/or authentication.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. An ink having infrared (IR) absorptivity comprising:
an IR absorptive pigment having low visible color and having an IR absorbance of between approximately 10 and 60% for light having a wavelength of between approximately 700 and 1000 nm, an IR absorbance of between approximately 20 and 88% for light having a wavelength of between approximately 1000 and 1500 nm, and an IR absorbance of between approximately 20 and 95% for light having a wavelength of between approximately 1500 and 2500 nm;
a liquid ink vehicle; and
a pigment configured to match a color of a selected substrate on which said ink is to be used.

2. The ink of claim 1, wherein said IR absorptive pigment comprises a tin oxide containing a transition metal or a transition metal oxide.

3. The ink of claim 1, wherein said IR absorptive pigment comprises a light grey or near white pigment.

4. The ink of claim 2, wherein said IR absorptive pigment comprises an antimony-doped tin dioxide.

5. The ink of claim 1, wherein said IR absorptive pigment comprises a platelet shape.

6. The ink of claim 1, wherein said IR absorptive pigment comprises an average particle size between approximately 1 and 100 μm.

7. The ink of claim 1, wherein said IR absorptive pigment comprises between approximately 0.01 and 70.0% by weight of said ink.

8. The ink of claim 1, wherein the liquid ink vehicle is a jettable vehicle, and wherein said IR absorptive pigment is dispersed in said jettable vehicle.

9. A method of making an IR absorptive ink comprising:
identifying a substrate;
providing liquid ink vehicle;
dispersing an IR absorptive pigment having a low visible color in said liquid ink vehicle; and
adding a colored dye or pigment to said vehicle, wherein said colored dye or pigment is configured to modify a color of said ink to match a color of a selected the identified substrate on which said ink will be used.

10. The method of claim 9, wherein said IR absorptive pigment comprises a tin oxide containing a transition metal or a transition metal oxide.

11. The method of claim 10, wherein said IR absorptive pigment comprises a light grey or near white pigment.

12. The method of claim 11, wherein said IR absorptive pigment comprises an average particle size between approximately 1 and 100 μm.

13. The ink of claim 1, further comprising an ultraviolet (UV) curable matrix.

14. The ink of claim 13, further comprising a UV photoinitiator.

* * * * *

UNITED STATES PATENT AND TRADEMARK OFFICE
CERTIFICATE OF CORRECTION

| | | |
|---|---|---|
| PATENT NO. | : 8,007,578 B2 | Page 1 of 1 |
| APPLICATION NO. | : 11/246502 | |
| DATED | : August 30, 2011 | |
| INVENTOR(S) | : Jayprakash C. Bhatt | |

It is certified that error appears in the above-identified patent and that said Letters Patent is hereby corrected as shown below:

In column 12, line 6, in Claim 9, delete "liquid" and insert -- a liquid --, therefor.

In column 12, line 12, in Claim 9, before "the" delete "a selected".

Signed and Sealed this
Tenth Day of July, 2012

David J. Kappos
*Director of the United States Patent and Trademark Office*